No. 890,496. PATENTED JUNE 9, 1908.
H. W. CHENEY.
PROTECTIVE DEVICE FOR ELECTRIC CIRCUITS.
APPLICATION FILED APR. 29, 1907.

Witnesses

Inventor
Herbert W. Cheney
By Chas. E. Lord
Attorney

UNITED STATES PATENT OFFICE.

HERBERT W. CHENEY, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

PROTECTIVE DEVICE FOR ELECTRIC CIRCUITS.

No. 890,496.　　　　Specification of Letters Patent.　　　Patented June 9, 1908.

Application filed April 29, 1907. Serial No. 370,959.

*To all whom it may concern:*

Be it known that I, HERBERT W. CHENEY, citizen of the United States, residing at Norwood, in the county of Hamilton and State of Ohio, have invented certain new and useful Improvements in Protective Devices for Electric Circuits, of which the following is a full, clear, and exact specification.

My invention relates to protective devices for electric circuits, particularly as used in conjunction with motor starters.

As electric motors require more current to start them than to maintain them at normal speed, a protective device which properly protects a motor when at normal speed does not permit sufficient current to pass for starting it. Conversely, if the protective device permits the passage of the starting current it does not sufficiently protect the motor after the latter has reached full speed. Protective devices for other translating devices are open to the same objection.

The object of my invention is to provide a protective device in conjunction with a starting controller which shall properly protect a motor or other translating device at both starting and during normal operation while also allowing the heavy current necessary for starting.

My invention therefore comprises the combination of a translating device, a controller therefor, and a protective device for said translating device arranged to carry different currents in proportion to the total current supplied when the controller is in different positions.

Rather more specifically my invention comprises the combination of an electric motor, a starting controller therefor, a plurality of fuses, and connections whereby the controller when in a starting position completes the circuit through said fuses in parallel, and when in running position cuts out part of said parallel-connected fuses.

Other features of my invention will appear from the description and drawings and will be particularly pointed out in the claims.

Figure 1:
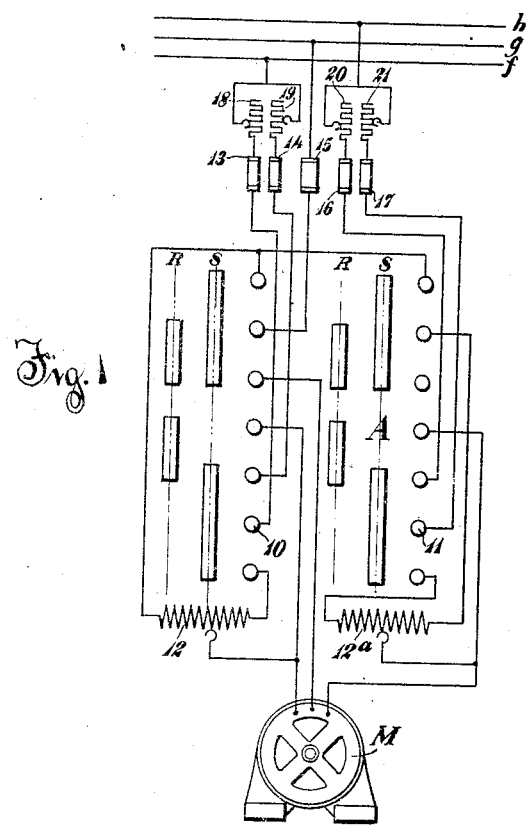
Figure 2:
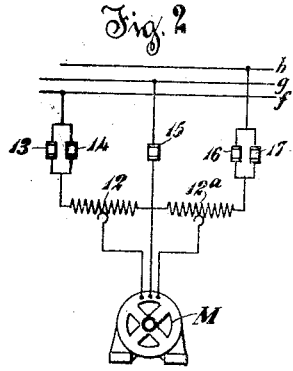
Figure 3:
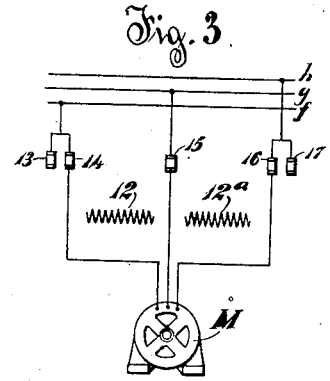

Figure 1 shows a development of a starting controller embodying my invention, the motor and the electrical connections being shown diagrammatically; Figs. 2 and 3 show simple connection diagrams for the starting and running positions of the controller respectively.

The duplicate halves of the controller drum A co-act respectively with the two sets of diametrically opposite contact fingers 10 and 11 during one complete operation of the controller and with the opposite sets during the next complete operation thereof. The normal operation of the controller is always in the same direction to avoid passing through the starting position in moving from the running to the off position. Such a controller has duplicate off, starting and running positions. In the controller shown there is but one starting position between the off and running positions, but obviously there may be any desired number of such starting positions. The structural details of the starting controller form no part of my present invention and are unnecessary to an understanding thereof.

When the controller is in a starting position S, the auto-transformer windings 12 and 12$^a$ are respectively connected between the mains $f$ and $g$, and $g$ and $h$, of a three-phase supply system, and the three terminals of the three-phase induction motor M are respectively connected to the common terminal of the two auto-transformer windings and to an intermediate point on each of said windings 12 and 12$^a$ thus constitute in effect a single V-connected auto-transformer, the main $g$ and one terminal of the motor being connected to the middle of the V.

In the connection between the main $g$ and the common terminal of the two auto-transformer windings is the fuse 15, while the other terminals of the transformer windings are respectively connected to the mains $f$ and $h$ through two smaller parallel-connected fuses 13 and 14, and 16 and 17. Variable resistances 18, 19, 20 and 21 are in series with the fuses 13, 14, 16 and 17 respectively to vary the relative current strengths in the prallel-connected fuses, to render these current strengths more nearly independent of variations of resistance in different fuses which may be used from time to time, and to provide means for correcting for any slight variation in such resistance which may occur.

When the controller is in running position R, the auto-transformer windings 12 and 12$^a$ and the fuses 13 and 17 are disconnected, and the motor terminals are connected to the three mains through the fuses 14, 15 and 16 respectively. Thus when the controller is in a starting position a heavy current may be drawn from the line, because the fuses 13 and 17 help the fuses 14 and 16 to carry such current. This allows sufficient current for starting the motor, the fuse 15 being preferably large enough to carry the full starting current. When the controller is in a running position, less current can be drawn from the line because the fuses 13 and 17 are cut out and the fuses 14 and 16 carry the entire current taken from the line. Thus the motor and the transformer are fully protected whether the controller is in starting or running position, while sufficient current can be obtained for starting the motor.

In many instances the resistances 18, 19, 20 and 21 may be dispensed with. In other instances the fuses 13 and 17 and the resistances 19 and 20 may be dispensed with, the resistances 18 and 21 taking the place of the fuses 13 and 17 and diminishing the proportional current taken by the fuses 14 and 16 when the controller is in a starting position. Moreover the fuse 15 is not always necessary.

Although I have described my invention as applied to a potential starter for three-phase induction motors, it is equally applicable to any other type of starting controller for any kind of motors and for other translating devices than motors. Many other changes may be made in the precise arrangements here shown and described, and all such which do not involve a departure from the spirit and scope of my invention, I aim to cover in the following claims.

What I claim as new is:—

1. In combination, a translating device, a controller therefor, and a fuse for protecting said translating device and arranged to carry different currents in proportion to the total current supplied when the controller is in different positions.

2. In combination, an electric motor, a starting controller therefor, and a protective device for said motor arranged to carry different currents in proportion to the total current supplied when the controller is in starting and running positions.

3. In combination, an electric motor, a fuse in the supply circuit therefor, and a starting controller for the motor arranged when in a starting position, and then only to shunt a part of the current around the fuse.

4. In combination, an electric motor, a fuse in the supply circuit therefor, and a controller for the motor arranged to vary the potential impressed thereon and in its different positions to make or break a shunt around said fuse.

5. In combination an electric motor, a starting controller therefor, a plurality of fuses, and connections whereby the controller when in a starting position completes the circuit through said fuses in parallel, and when in running position cuts out part of said parallel-connected fuses.

6. The combination of a translating device, a controller therefor, and a protective device arranged to carry part of the current supplied when the controller is in a starting position, and all of the current supplied when the controller is in running position.

7. In combination, an electric motor, two fuses, and a starting controller for the motor arranged when in a starting position to connect said two fuses in parallel in the motor supply circuit, and when in running position to cut out one of said fuses.

8. In combination, an electric motor, two fuses, and a starting controller for the motor arranged when in one position to connect said two fuses in parallel in the motor supply circuit, and when in another position to cut out one of said fuses.

9. In combination, an electric motor, two fuses, a starting controller for the motor arranged when in a starting position to connect said two fuses in parallel in the motor supply circuit, and when in running position to cut out one of said fuses, and means for varying the relative amounts of current taken by said two fuses when the controller is in starting position.

10. In combination, an electric motor, two fuses, a starting controller for the motor arranged when in a starting position to connect said two fuses in parallel in the motor supply circuit, and when in running position to cut out one of said fuses, and a variable resistance in the circuit of each of said fuses.

11. In combination, an electric motor, a fuse in the supply circuit thereof, a resistance, and a starting controller for the motor arranged when in a starting position to connect said resistance in shunt to said fuse.

12. In combination, an electric motor, a fuse in the supply circuit thereof, a variable resistance, and a starting controller for the motor arranged when in one position to connect said resistance in shunt to said fuse.

13. In combination, an induction motor, auto-transformer windings, a plurality of fuses, and a starting controller for the motor arranged when in starting position to connect the motor to the supply circuit through said fuses in parallel and through said auto-transformer windings, and when in running position to connect the motor directly to the supply circuit through less than all of said fuses.

14. In combination, an induction motor, auto-transformer windings, a plurality of fuses, and a starting controller for the motor arranged when in different positions to connect said motor to the supply circuit directly or through said auto-transformer windings, and to connect said fuses in parallel in said supply circuit or to cut out less than all of said fuses.

15. The combination with an electric motor, of two automatic cut-outs, and separate means for connecting said cut-outs in parallel in the supply circuit of the motor and for then disconnecting one of said cut-outs.

16. The combination with an electric motor, of a plurality of thermal cut-outs, and a switch separate from said cut-outs and arranged to connect said cut-outs in parallel in the motor supply circuit and then to disconnect part of said cut-outs.

17. In combination, a translating device, a plurality of fuses, and a switch separate from said fuses for connecting said translating device to a supply circuit first through said fuses in parallel and then through less than all of said fuses.

18. The combination of a translating device, a plurality of fuses, and a switch separate from said fuses and arranged to connect said motor to a supply circuit first through said fuses in such a manner that each fuse takes but part of the current and then so that one of the fuses carries more of the current.

In testimony whereof I affix my signature, in the presence of two witnesses.

HERBERT W. CHENEY.

Witnesses:
   GEO. B. SCHLEY,
   FRED J. KINSEY.

---

It is hereby certified that in Letters Patent No. 890,496, granted June 9, 1908, upon the application of Herbert W. Cheney, of Norwood, Ohio, for an improvement in "Protective Devices for Electric Circuits," an error appears in the printed specification requiring correction, as follows: In lines 82–83, page 1, after the word "windings" a period and the words *The windings* should be inserted; and that the said Letters Patent should be read with this correction therein that the same may conform to the record of the case in the Patent Office.

Signed and sealed this 4th day of August, A. D., 1908.

[SEAL.]

C. C. BILLINGS,

*Acting Commissioner of Patents.*